US009525863B2

(12) United States Patent
Nawasra et al.

(10) Patent No.: US 9,525,863 B2
(45) Date of Patent: Dec. 20, 2016

(54) TIME-OF-FLIGHT DEPTH MAPPING WITH FLEXIBLE SCAN PATTERN

(71) Applicant: APPLE INC., Cupertino, CA (US)

(72) Inventors: Jawad Nawasra, Cupertino, CA (US); Scott T. Smith, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/698,912

(22) Filed: Apr. 29, 2015

(65) Prior Publication Data

US 2016/0323562 A1    Nov. 3, 2016

(51) Int. Cl.
*H04N 1/04*     (2006.01)
*H04N 13/02*    (2006.01)
*H04N 13/00*    (2006.01)

(52) U.S. Cl.
CPC ...... *H04N 13/0253* (2013.01); *H04N 13/0022* (2013.01); *H04N 13/025* (2013.01); *H04N 2013/0081* (2013.01)

(58) Field of Classification Search
CPC ... A61B 5/1077; A61B 5/4547; A61C 9/0053; G01B 11/24; G01B 11/25; G01B 11/2518; G01B 11/2513; G02B 27/1066; G02B 27/12; G02B 19/0028; G02B 19/0057; G02B 27/0944; G02B 27/0972; G02B 27/0983
USPC .... 382/154, 100, 106, 284; 348/336, 46, 42, 348/E13.074, E5.024, E9.005, 14.16, 218.1, 348/222.1; 356/602, 603, 608, 328, 511, 601; 600/476, 590; 433/215; 340/5.83; 345/419, 345/420, 621, 629, 632, 634; 359/738; 362/11; 358/474, 1.15
See application file for complete search history.

(56) References Cited

U.S. PATENT DOCUMENTS

| 5,090,797 A | * | 2/1992 | Cleveland ............ G02B 7/1827 351/210 |
| 5,557,397 A | * | 9/1996 | Hyde ...................... G01S 17/42 356/2 |
| 5,701,326 A | | 12/1997 | Flowers |
| 6,815,687 B1 | | 11/2004 | Branch-Sullivan et al. |
| 6,912,293 B1 | * | 6/2005 | Korobkin ................ G06T 17/10 345/420 |

(Continued)

FOREIGN PATENT DOCUMENTS

| CN | 101371786 A | 2/2009 |
| EP | 2873986 A1 | 5/2015 |

(Continued)

OTHER PUBLICATIONS

European Application #13748754.2 Search Report dated Oct. 5, 2015.

(Continued)

*Primary Examiner* — Negussie Worku
(74) *Attorney, Agent, or Firm* — D. Kligler IP Services Ltd.

(57) ABSTRACT

Imaging apparatus includes an image sensor, which acquires an image of a scene, and a scanner, which includes an optical transmitter, which emits a sequence of optical pulses toward the scene, and an optical receiver, which receives the optical pulses reflected from the scene and generates an output indicative of respective times of flight of the pulses. Scanning optics are configured to scan the optical pulses over the scene in a scan pattern that covers and is contained within a non-rectangular area within the scene. A processor identifies an object in the image of the scene, defines the non-rectangular area so as to contain the identified object, and processes the output of the optical receiver so as to extract a three-dimensional (3D) map of the object.

18 Claims, 3 Drawing Sheets

(56) References Cited

U.S. PATENT DOCUMENTS

| | | | |
|---|---|---|---|
| 7,952,781 B2 | 5/2011 | Weiss et al. | |
| 8,018,579 B1 | 9/2011 | Krah | |
| 8,493,496 B2* | 7/2013 | Freedman | G01B 11/25 |
| | | | 345/32 |
| 8,508,676 B2 | 8/2013 | Silverstein et al. | |
| 8,963,997 B2 | 2/2015 | Michaelis et al. | |
| 9,098,931 B2 | 8/2015 | Shpunt et al. | |
| 9,157,790 B2 | 10/2015 | Shpunt et al. | |
| 2002/0071169 A1 | 6/2002 | Bowers et al. | |
| 2003/0090818 A1 | 5/2003 | Wittenberger | |
| 2003/0227614 A1 | 12/2003 | Taminiau et al. | |
| 2004/0063235 A1 | 4/2004 | Chang | |
| 2004/0105139 A1 | 6/2004 | Hirose et al. | |
| 2004/0254476 A1* | 12/2004 | Quadling | A61B 5/0066 |
| | | | 600/476 |
| 2005/0024701 A1 | 2/2005 | Cannon et al. | |
| 2005/0110157 A1 | 5/2005 | Sherrer et al. | |
| 2006/0176468 A1 | 8/2006 | Anderson et al. | |
| 2006/0269896 A1 | 11/2006 | Liu et al. | |
| 2007/0221826 A1 | 9/2007 | Bechtel et al. | |
| 2007/0279722 A1 | 12/2007 | Yavid et al. | |
| 2008/0218832 A1 | 9/2008 | Mizoguchi | |
| 2008/0278572 A1 | 11/2008 | Gharib et al. | |
| 2009/0141192 A1 | 6/2009 | Nojima | |
| 2009/0183125 A1 | 7/2009 | Magal et al. | |
| 2009/0185274 A1 | 7/2009 | Shpunt | |
| 2010/0007717 A1 | 1/2010 | Spektor et al. | |
| 2010/0142014 A1 | 6/2010 | Rosen et al. | |
| 2010/0142020 A1 | 6/2010 | Kim | |
| 2010/0219326 A1 | 9/2010 | Klein et al. | |
| 2010/0225746 A1 | 9/2010 | Shpunt et al. | |
| 2010/0284082 A1 | 11/2010 | Shpunt et al. | |
| 2011/0114857 A1 | 5/2011 | Akerman et al. | |
| 2011/0187878 A1 | 8/2011 | Mor et al. | |
| 2011/0188054 A1 | 8/2011 | Petronius | |
| 2011/0205421 A1* | 8/2011 | Shpunt | G02B 27/1066 |
| | | | 348/336 |
| 2011/0228251 A1 | 9/2011 | Yee et al. | |
| 2011/0279648 A1 | 11/2011 | Lutian et al. | |
| 2011/0295331 A1 | 12/2011 | Wells et al. | |
| 2011/0310125 A1 | 12/2011 | McEldowney et al. | |
| 2012/0236379 A1 | 9/2012 | Da Silva et al. | |
| 2013/0207970 A1 | 8/2013 | Shpunt et al. | |
| 2013/0230224 A1* | 9/2013 | Claude | A61B 5/055 |
| | | | 382/131 |
| 2014/0049373 A1* | 2/2014 | Troy | G06K 9/001 |
| | | | 340/5.83 |
| 2014/0063189 A1 | 3/2014 | Zheleznyak et al. | |
| 2014/0120493 A1* | 5/2014 | Levin | G06T 7/2066 |
| | | | 433/29 |
| 2014/0291496 A1 | 10/2014 | Shpunt et al. | |
| 2016/0125638 A1* | 5/2016 | Grimaud | G06T 15/04 |
| | | | 348/169 |
| 2016/0245919 A1* | 8/2016 | Kalscheur | G01S 17/89 |

FOREIGN PATENT DOCUMENTS

| | | |
|---|---|---|
| TW | 542946 B | 7/2003 |
| TW | 200950501 A | 12/2009 |
| WO | 2004044525 A2 | 5/2004 |
| WO | 2007/043036 A1 | 4/2007 |
| WO | 2007/105205 A2 | 9/2007 |
| WO | 2008/120217 A2 | 10/2008 |
| WO | 2009107922 A1 | 9/2009 |
| WO | 2012/011044 A1 | 1/2012 |
| WO | 2012020380 A1 | 2/2012 |

OTHER PUBLICATIONS

European Application #13748754.2 Search Report dated Jan. 19, 2016.
JP application # 2014-557150 Office Action dated Jan. 27, 2016.
CN application # 201380007623.5 Office Action dated Jan. 21, 2016.
KR application # 10-2014-7025753 Office Action dated Mar. 16, 2016.
Btendo, "Two Uni-axial Scanning Mirrors Vs One Bi-axial Scanning Mirror", Kfar Saba, Israel, Aug. 13, 2008.
Microvision Inc., "Micro-Electro-Mechanical System (MEMS) Scanning Mirror", years 1996-2009.
International Application PCT/IB2011/053560 Search Report dated Jan 19, 2012.
TW Application # 100128723 Search Report dated Sep. 23, 2015.
U.S. Appl. No. 13/766,801 Office Action Dated Jul. 16, 2015.
International Application # PCT/IB2013/051189 Search Report dated Jun. 18, 2013.
U.S. Appl. No. 13/766,811 Office Action Dated May 14, 2015.
TW Application # 102105535 Office Action and search report dated Oct. 14, 2015.
KR Application # 10-2014-7025753 Office Action dated Sep. 23, 2015.
AU Application # 2013219966 Office Action dated Jan. 29, 2015.
International Application # PCT/US16/24882 Search Report dated Jul. 13, 2016.

* cited by examiner

TIME-OF-FLIGHT DEPTH MAPPING WITH FLEXIBLE SCAN PATTERN

FIELD OF THE INVENTION

The present invention relates generally to methods and devices for projection and capture of optical radiation, and particularly to optical 3D mapping.

BACKGROUND

Various methods are known in the art for optical 3D mapping, i.e., generating a 3D profile of the surface of an object by processing light reflected from the object. This sort of 3D profile is also referred to as a 3D map, 3D image, depth map or depth image, and 3D mapping is also referred to as depth mapping. The term "light," as used in the context of the present description and in the claims, refers to optical radiation in any of the visible, infrared, and ultraviolet ranges.

U.S. Patent Application Publication 2011/0279648, for example, describes a method for constructing a 3D representation of a subject, which comprises capturing, with a camera, a 2D image of the subject. The method further comprises scanning a modulated illumination beam over the subject to illuminate, one at a time, a plurality of target regions of the subject, and measuring a modulation aspect of light from the illumination beam reflected from each of the target regions. A moving-mirror beam scanner is used to scan the illumination beam, and a photodetector is used to measure the modulation aspect. The method further comprises computing a depth aspect based on the modulation aspect measured for each of the target regions, and associating the depth aspect with a corresponding pixel of the 2D image.

As another example, U.S. Patent Application Publication 2013/0207970 describes mapping apparatus that includes a transmitter, which emits a beam comprising pulses of light, and a scanner, which is configured to scan the beam, within a predefined scan range, over a scene. A receiver receives the light reflected from the scene and to generate an output indicative of a time of flight of the pulses to and from points in the scene. A processor is coupled to control the scanner so as to cause the beam to scan over a selected window within the scan range and to process the output of the receiver so as to generate a 3D map of a part of the scene that is within the selected window.

SUMMARY

Embodiments of the present invention that are described hereinbelow provide improved apparatus and methods for depth mapping using a scanning beam.

There is therefore provided, in accordance with an embodiment of the invention, imaging apparatus, including an image sensor, which is configured to acquire an image of a scene. A scanner includes an optical transmitter, which is configured to emit a sequence of optical pulses toward the scene, and an optical receiver, which is configured to receive the optical pulses reflected from the scene and to generate an output indicative of respective times of flight of the pulses. Scanning optics are configured to scan the optical pulses over the scene in a scan pattern that covers and is contained within a non-rectangular area within the scene. A processor is configured to identify an object in the image of the scene, to define the non-rectangular area so as to contain the identified object, and to process the output of the optical receiver as the scanning optics scan the optical pulses over the non-rectangular area so as to extract a three-dimensional (3D) map of the object.

In some embodiments, the processor is configured to process the image so as to delineate an outer boundary of the identified object, and to define the non-rectangular area so as to coincide with the outer boundary.

Additionally or alternatively, the apparatus includes a user interface, configured to receive an input designating the object, wherein the processor is configured to identify the object responsively to the input. In one embodiment, the user interface includes a touchscreen, and the processor is configured to display the acquired image on the touchscreen.

In a disclosed embodiment, the scanning optics include first and second scanning mirrors, which are configured to rotate in accordance with the scan pattern, wherein the first scanning mirror directs the sequence of optical pulses toward the scene along a transmit path, while the second scanning mirror directs the pulses reflected from the scene along a return path, separated from the transmit path, toward the optical receiver. In one embodiment, the first and second scanning mirrors are contained, together with the optical transmitter and the optical receiver, in a single module. In another embodiment, the first scanning mirror and the optical transmitter are contained in a first module, while the second scanning mirror and the optical receiver are contained in a second module, separate from the first module. Additionally or alternatively, the scanner comprises a first turning mirror, which reflects the optical pulses from the optical transmitter to the first scanning mirror, and a second turning mirror, which reflects the pulses reflected from the scene from the second scanning mirror to the optical receiver.

In one embodiment, the scan pattern includes a raster pattern including multiple scan lines of different, respective lengths. In another embodiment, the scan pattern includes a non-raster pattern.

There is also provided, in accordance with an embodiment of the invention, a method for imaging, which includes acquiring an image of a scene and identifying an object in the image of the scene. A non-rectangular area in the scene that contains the identified object is defined, and a sequence of optical pulses is scanned over the scene in a scan pattern that covers and is contained within the non-rectangular area. The optical pulses reflected from the scene are received, and an output indicative of respective times of flight of the pulses is generated and processed so as to extract a 3D map of the object.

The present invention will be more fully understood from the following detailed description of the embodiments thereof, taken together with the drawings in which:

DETAILED DESCRIPTION OF EMBODIMENTS

Techniques and devices for 3D mapping that are known in the art commonly suffer from problems of low scanning speed and limited resolution. Furthermore, processing a 3D map of a scene, in order to segment and separate objects of interest from a cluttered background, can be a difficult task, with results that are frequently imprecise. In many cases, the user requires 3D information only with regard to a certain object of interest in the scene, and the remainder of the 3D map data is superfluous.

Embodiments of the present invention that are described herein provide apparatus and methods that can be useful, inter alia, in focusing 3D mapping and processing resources on objects of interest. In the disclosed embodiments, an image sensor acquires an image of a scene, and a time-of-flight (TOF) scanner also scans the scene. The scanner comprises an optical transmitter, which emits a sequence of optical pulses toward the scene; an optical receiver, which receives the reflected pulses and generates an output indicative of respective times of flight of the pulses; and scanning optics, which are capable of scanning the optical pulses over the scene in a non-rectangular scan pattern. The scan pattern is "non-rectangular" in the sense that it covers and is contained within a non-rectangular area within the scene, also referred to as a non-rectangular window. In other words, the scan pattern is not limited to a rectangular area or rectangular target. The scan pattern may take the form, for example, of a raster pattern comprising multiple scan lines of different, respective lengths, or of a non-raster pattern.

A processor identifies an object in the image of the scene and defines a non-rectangular area that contains the identified object. For example, the processor may delineate an outer boundary of the identified object in the image, and then define the non-rectangular area so as to coincide with this outer boundary. The processor directs the scan pattern of the scanning optics to scan over this non-rectangular area, and processes the output of the optical receiver during this scan so as to extract a three-dimensional (3D) map of the object.

In some embodiments, the apparatus comprises a user interface, which enables a user of the apparatus to designate the object that is to be mapped. For example, the image of the scene may be presented on a touchscreen or other interactive display, on which the user can point to, outline, or otherwise select the object.

Figure 1:
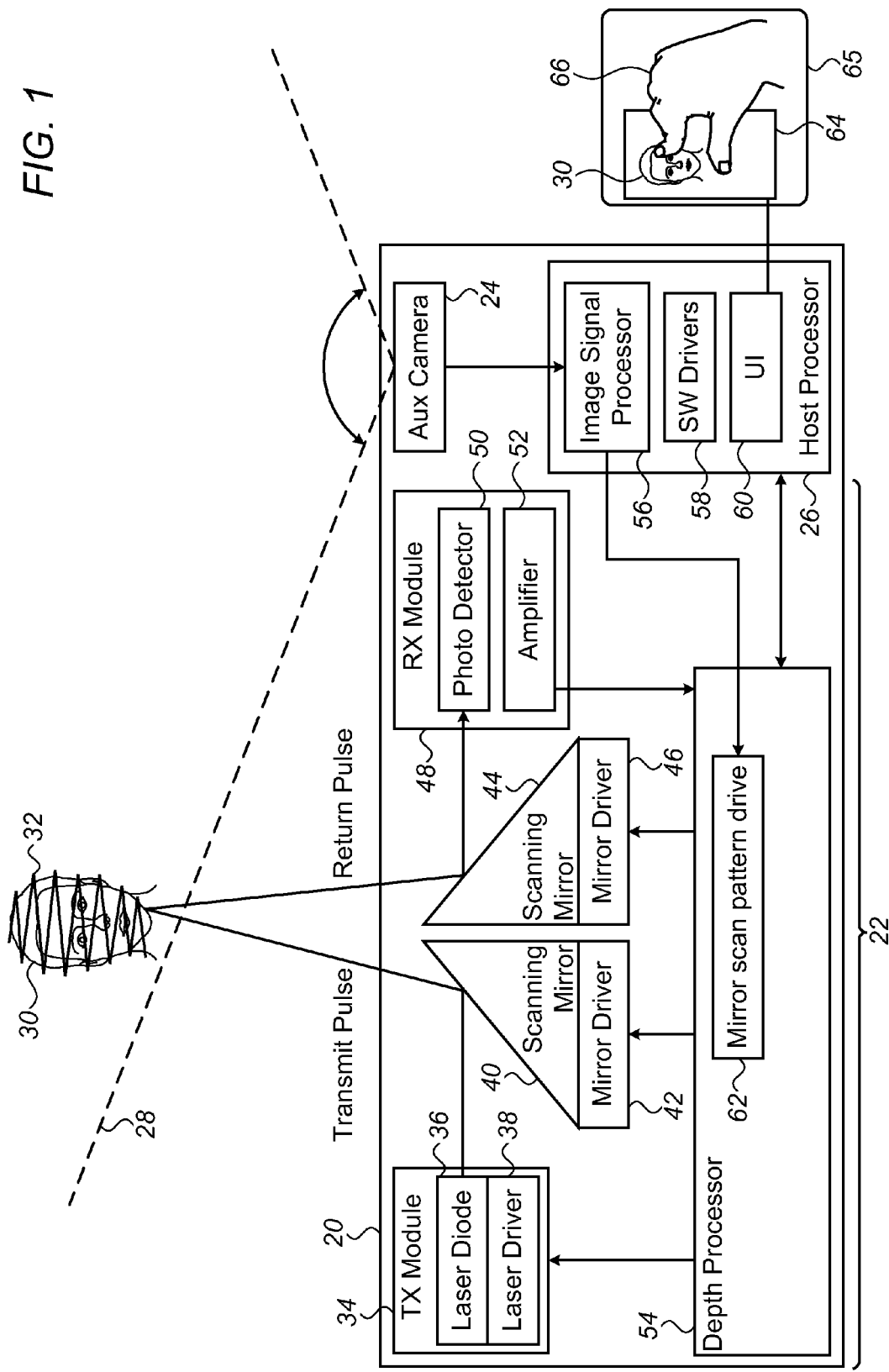
FIG. 1 is a block diagram that schematically illustrates imaging apparatus, in accordance with an embodiment of the invention.

FIG. 1 is a block diagram that schematically illustrates imaging apparatus 20, which performs both 2D and 3D imaging (in other words, 3D mapping), in accordance with an embodiment of the invention. Apparatus 20 comprises a scanning engine 22 and an auxiliary camera 24, which are coupled to and controlled by a host processor 26. Although apparatus 20 is shown, for the sake of conceptual clarity, as a unitary block in FIG. 1, in practice the components of the apparatus may be integrated into a computing or multimedia device, for example, in which camera 24 and processor 26 perform other functions, in addition to those connected with apparatus 20.

Camera 24 captures a 2D image of a scene 28, which contains an object 30 of interest (a person's head in this example). Processor 26 processes the 2D image in order to identify object 30, and defines a non-rectangular area within scene 28 that contains the identified object. The processor causes scanning engine 22 to scan over object 30 in a scan pattern 32 that covers and is contained within the non-rectangular area. In the pictured example, pattern 32 is a raster pattern, comprising multiple parallel (or nearly parallel) scan lines, though the lines are of different lengths. Alternatively, engine may scan the area in a non-raster pattern, such as a spiral pattern or a Lissajous pattern.

Scanning engine 22 comprises an optical transmitter module 34, which emits a sequence of optical pulses along a transmit path toward scene 28. In the pictured example, module 34 comprises a laser diode 36, which is controlled by a laser driver circuit 38 to emit a train of short pulses of optical radiation.

The pulses emitted by transmitter module 34 are reflected from a first scanning mirror 40, which is controlled by a mirror driver circuit 42 to scan the pulses along pattern 32. A second scanning mirror 44 directs the pulses reflected from scene 28 along a return path, separated from the transmit path, toward an optical receiver module 48. Mirror 44 is controlled by a mirror driver circuit 46 to scan in synchronization with mirror 40. Alternatively, a single scanning mirror or mirror array (not shown in the figures) may be used on both the transmit and return path. In addition to mirrors 40 and 44, scanning engine 22 typically comprises further optical elements for collimating, collecting, and filtering the optical pulses, as will be apparent to those skilled in the art.

Optical receiver module 48 receive the optical pulses reflected from the scene and generates an output that is indicative of respective times of flight of the pulses. For this purpose, in the present embodiment, module 48 comprises a high-speed photodetector 50, such as an avalanche photodiode, coupled to a suitable amplifier 52. These elements generate a train of electrical pulses whose delay, relative to the pulses that drive transmitter module 34, is indicative of respective times of flight of the optical pulses to and from scene 28. A depth processor 54 comprises logic circuits that process this train of electrical pulses, as mirrors 40 and 44 scan over the designated area of object 30, so as to extract a 3D map of the object.

An image signal processor 56, typically implemented in software running on host processor 26, processes the 2D image captured by camera 24 in order to identify object 30 and thus define the area to be covered by scan pattern 32. As noted earlier, this area is typically non-rectangular (although in some cases the area of the scan may be rectangular). In the present example, image signal processor 56 detects and delineates an outer boundary containing object 30, and defines the non-rectangular scan area as the area within this boundary. Host processor 26 conveys this definition to mirror scan pattern driving logic 62 in scanning engine 22, which controls mirror driver circuits 42 and 46 accordingly.

Host processor 26 typically runs other programs, including software drivers 58 and a user interface 60. User interface 60 interacts with user input and output devices, which can enable a user of apparatus 20 to designate objects for 3D mapping. This sort of interactive object designation may operate in concert with the automated, image-based techniques for selection of the scan area for 3D mapping by scanning engine 22. In the pictured example, user interface 60 displays the images acquired by camera 24 on a touchscreen 64 of an input device 65, which enables the user to designate object 30 by making suitable gestures with the fingers of a hand 66 on the touchscreen, which are sensed by user interface 60. Image signal processor 56 locates object 30 in the images based on this user input. Alternatively, the image signal processor may identify objects of interest autonomously, based on criteria that may be predefined and/or input by a user of apparatus 20. In any case, depth processor 54 outputs the 3D map of object 30 to host processor 26, which presents the 3D information on a screen and/or uses the 3D information as an input to other software applications.

Figure 2A:
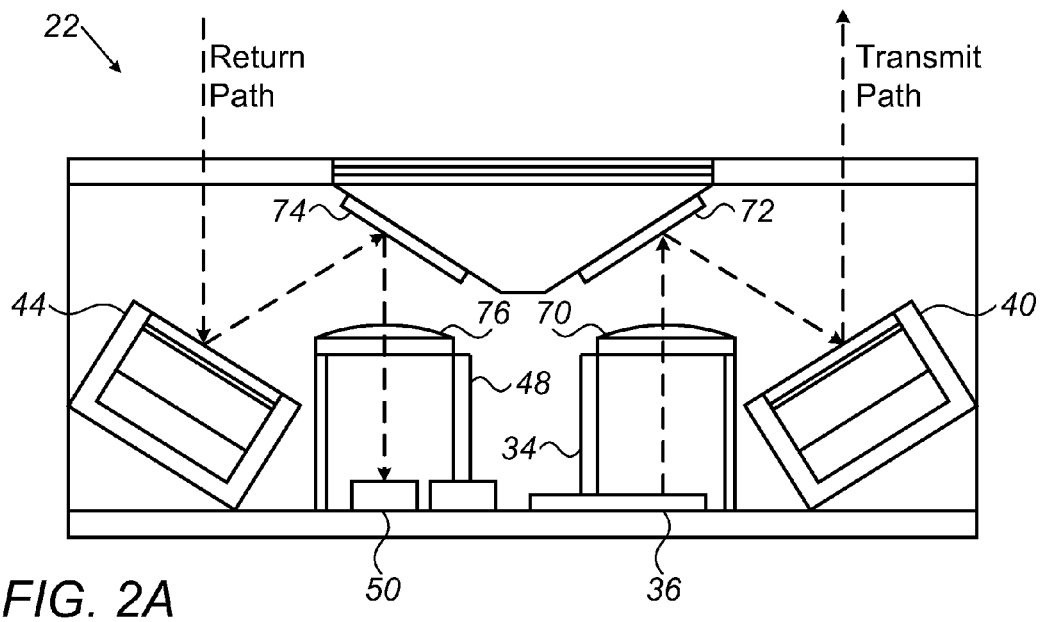
FIG. 2A is a schematic side view of a scanning engine, in accordance with an embodiment of the invention.

FIG. 2A is a schematic side view showing details of scanning engine 22, in accordance with an embodiment of the invention. This particular configuration of the scanning engine is shown by way of example, and other designs may alternatively be used in implementing the principles of the present invention. For instance, although scanning mirrors 40 and 44 are spaced apart near the edges of scanning engine 22 in FIG. 2A, these mirrors may alternatively be placed at the center of the scanning engine and/or located side by side. Further alternatively, the functions of the scanning engine may be implemented using separate transmit and receive modules, at different locations in apparatus 20, as illustrated below in FIG. 2B.

In the pictured embodiment, optical pulses generated by laser diode 36 are collimated by a collimation lens 70, and then reflect from a turning mirror onto scanning mirror 40. Reflected pulses on the return path strike scanning mirror 44, which directs the pulses to reflect from a turning mirror 74, via a collection lens 76 onto photodetector 50. Separating the transmit and return paths in the manner shown in the present figures can be advantageous in terms of system design flexibility and compactness, as well as in avoiding stray reflections of the transmitted pulses within engine 22, which might otherwise saturate photodetector 50.

Figure 2B:
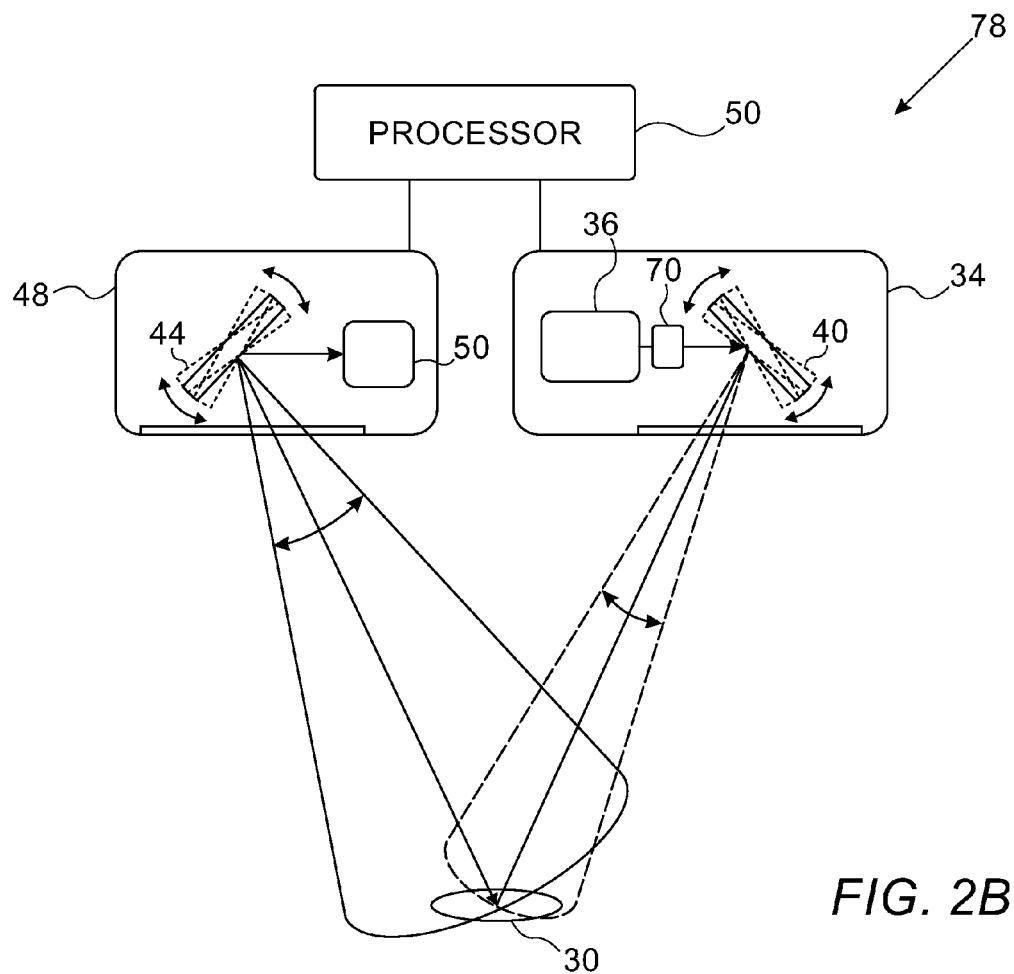
FIG. 2B is a schematic side view of a scanning engine, in accordance with another embodiment of the invention.

FIG. 2B is a schematic side view showing details of a scanning engine 78, in accordance with another embodiment of the invention. This embodiment is functionally similar to the embodiment of FIG. 2A, and elements having similar functions in the two embodiments are labeled with the same numbers in the corresponding figures. Scanning engine 78 differs from scanning engine 22 primarily in that transmitter module 34 and receiver module 48 are packaged as separate units, which may be positioned as desired in or around apparatus 20.

Figure 3:
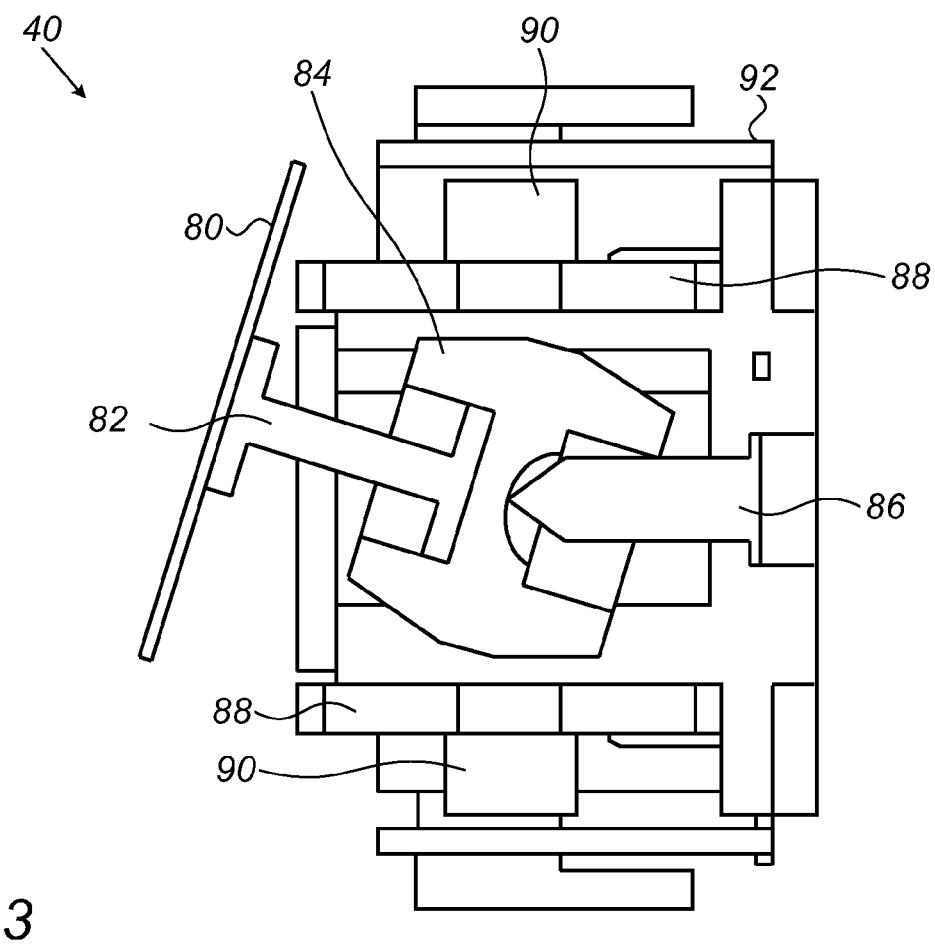
FIG. 3 is a schematic side view of an optical scanner, in accordance with an embodiment of the invention.

FIG. 3 is a schematic side view of scanning mirror 40, in accordance with an embodiment of the invention. Scanning mirror 44 is typically of similar design. The pictured design is shown as an example of a non-resonant magnetic tilt actuator, which may be driven by driver 42 to generate substantially any desired scan pattern within the field of view of apparatus 20. Alternatively, other sorts of scanners may be incorporated in scanning engine 22, including both non-resonant and resonant designs, with any sort of drive that is known in the art, including electrostatic, piezoelectric, and mechanical drives, as well as other types of magnetic drives.

Scanning mirror 40 comprises a reflector 80, which is connected to a mirror rotor 84 by a mounting post 82. Mirror rotor 84 in this example is configured as a magnetic barrel component, which is roughly cylindrical with a partially hollow interior having one or more cavities, one of which contains the base of mounting post 82. The opposing cavity of rotor 84 fits over and turns on a magnetic pivot 86, which is mounted on a stationary base within a casing 92 of mirror 40. Rotor 84 typically comprises a permanent magnet.

Magnetic coils 88 on opposing sides of rotor 84 serve as the active element of the stator of scanning mirror 40. Mirror driver circuit 42 drives coils 88 with suitable currents to generate magnetic forces, which attract and repel rotor 84 and thus alter the orientation of the rotor and hence of reflector 80. Although only two coils 88 are shown in the figure, above and below rotor 84 in this view, the stator typically comprises additional coils (not shown), which would be positioned behind and in front of rotor 84 in the present view. The set of four (or more) stator coils can be driven by circuit 42 to rotate reflector 80 to any desired angle and thus to generate substantially any sort of scan pattern, including both raster and non-raster patterns. Scanning mirror 40 optionally includes sensors 90 for monitoring device operation, such as Hall Effect or other magnetic sensors.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Imaging apparatus, comprising:
   an image sensor, which is configured to acquire an image of a scene;
   a scanner, comprising:
      an optical transmitter, which is configured to emit a sequence of optical pulses toward the scene;
      an optical receiver, which is configured to receive the optical pulses reflected from the scene and to generate an output indicative of respective times of flight of the pulses; and
      scanning optics, which are configured to scan the optical pulses over the scene in a scan pattern that covers and is contained within a non-rectangular area within the scene,
      wherein the scanning optics comprise first and second scanning mirrors, which are configured to rotate in accordance with the scan pattern, wherein the first scanning mirror directs the sequence of optical pulses toward the scene along a transmit path, while the second scanning mirror directs the pulses reflected from the scene along a return path, separated from the transmit path, toward the optical receiver; and
   a processor, which is configured to identify an object in the image of the scene, to define the non-rectangular area so as to contain the identified object, and to process the output of the optical receiver as the scanning optics scan the optical pulses over the non-rectangular area so as to extract a three-dimensional (3D) map of the object.

2. The apparatus according to claim 1, wherein the processor is configured to process the image so as to delineate an outer boundary of the identified object, and to define the non-rectangular area so as to coincide with the outer boundary.

3. The apparatus according to claim 1, and comprising a user interface, configured to receive an input designating the object, wherein the processor is configured to identify the object responsively to the input.

4. The apparatus according to claim 3, wherein the user interface comprises a touchscreen, and wherein the processor is configured to display the acquired image on the touchscreen.

5. The apparatus according to claim 1, wherein the first and second scanning mirrors are contained, together with the optical transmitter and the optical receiver, in a single module.

6. The apparatus according to claim 1, wherein the first scanning mirror and the optical transmitter are contained in a first module, while the second scanning mirror and the optical receiver are contained in a second module, separate from the first module.

7. The apparatus according to claim 1, wherein the scanner comprises a first turning mirror, which reflects the optical pulses from the optical transmitter to the first scanning mirror, and a second turning mirror, which reflects the pulses reflected from the scene from the second scanning mirror to the optical receiver.

8. The apparatus according to claim 1, wherein the scan pattern comprises a raster pattern comprising multiple scan lines of different, respective lengths.

9. The apparatus according to claim 1, wherein the scan pattern comprises a non-raster pattern.

10. A method for imaging, comprising:
acquiring an image of a scene;
identifying an object in the image of the scene;
defining a non-rectangular area in the scene that contains the identified object;
scanning a sequence of optical pulses over the scene in a scan pattern that covers and is contained within the non-rectangular area,
wherein scanning the sequence of optical pulses comprises driving a first scanning mirror to rotate in accordance with the scan pattern so as to direct the sequence of optical pulses toward the scene along a transmit path;
receiving the optical pulses reflected from the scene and generating an output indicative of respective times of flight of the pulses,
wherein receiving the optical pulses comprises driving a second scanning mirror to rotate in accordance with the scan pattern so as to direct the pulses reflected from the scene along a return path, separated from the transmit path, toward an optical receiver; and
processing the output so as to extract a three-dimensional (3D) map of the object.

11. The method according to claim 10, wherein defining the non-rectangular area comprises processing the image so as to delineate an outer boundary of the identified object, and defining the non-rectangular area so as to coincide with the outer boundary.

12. The method according to claim 10, wherein identifying the object comprises receiving a user input designating the object.

13. The method according to claim 12, wherein receiving the user input comprises display the acquired image on a touchscreen, and sensing a gesture designating the object on the touchscreen.

14. The method according to claim 10, wherein the first and second scanning mirrors are contained, together with an optical transmitter and an optical receiver, in a single module.

15. The method according to claim 10, wherein the first scanning mirror and an optical transmitter are contained in a first module, while the second scanning mirror and an optical receiver are contained in a second module, separate from the first module.

16. The method according to claim 10, wherein scanning the sequence of the optical pulses comprises applying a first turning mirror to reflect the optical pulses from an optical transmitter to the first scanning mirror, and wherein receiving the optical pulses comprises applying a second turning mirror to reflect the pulses reflected from the scene from the second scanning mirror to the optical receiver.

17. The method according to claim 10, wherein the scan pattern comprises a raster pattern comprising multiple scan lines of different, respective lengths.

18. The method according to claim 10, wherein the scan pattern comprises a non-raster pattern.

* * * * *